Figure 4:
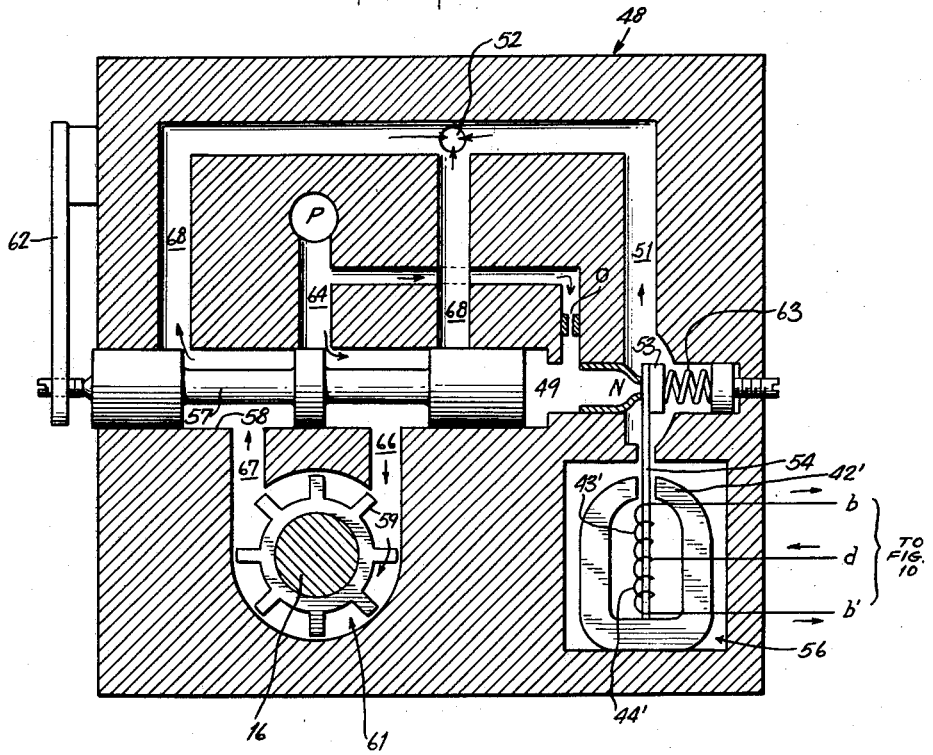

March 29, 1960 M. K. ZINN 2,930,247
POWER STEERING MECHANISM
Filed Feb. 10, 1955 4 Sheets-Sheet 1
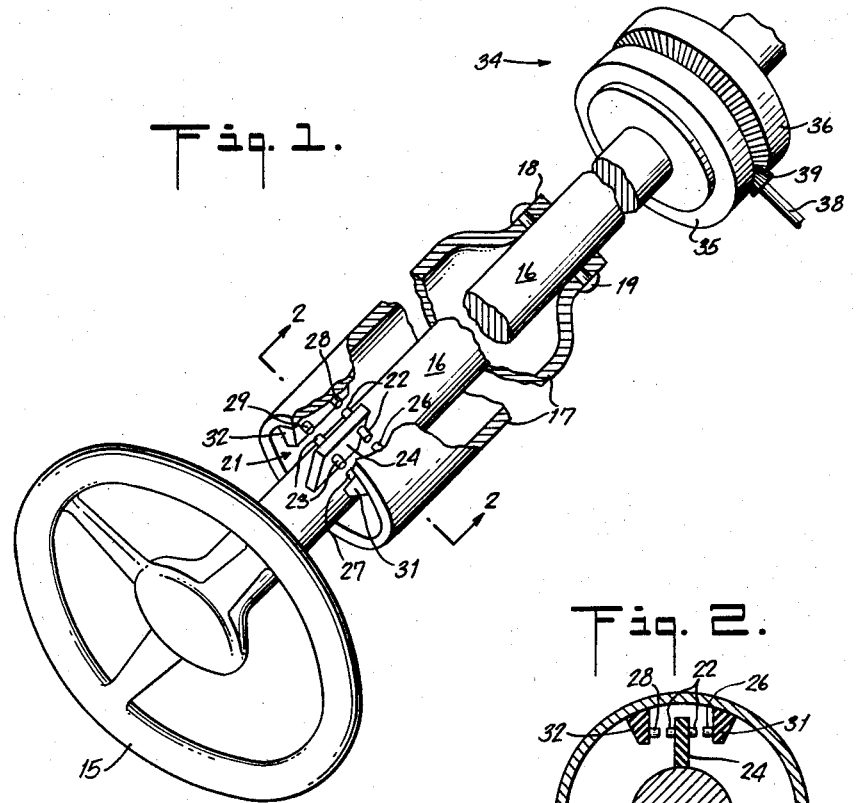
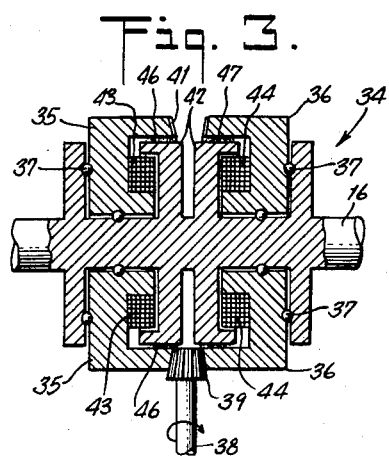
INVENTOR.
MANVEL K. ZINN
BY Leo C. Kraginski
ATTORNEY March 29, 1960  M. K. ZINN  2,930,247
POWER STEERING MECHANISM
Filed Feb. 10, 1955  4 Sheets-Sheet 2

INVENTOR.
MANVEL K. ZINN
BY Leo C. Krazinski
ATTORNEY

March 29, 1960
M. K. ZINN
2,930,247
POWER STEERING MECHANISM
Filed Feb. 10, 1955
4 Sheets-Sheet 3
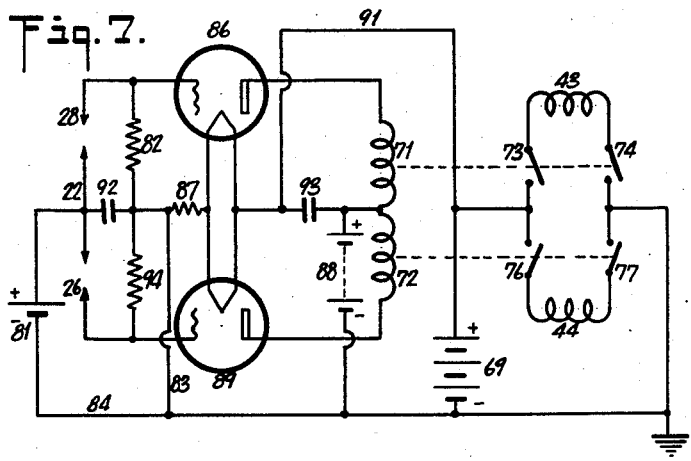
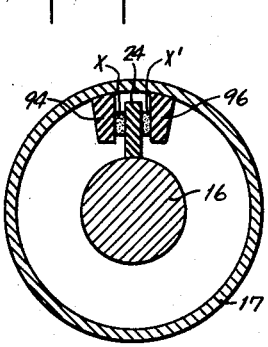
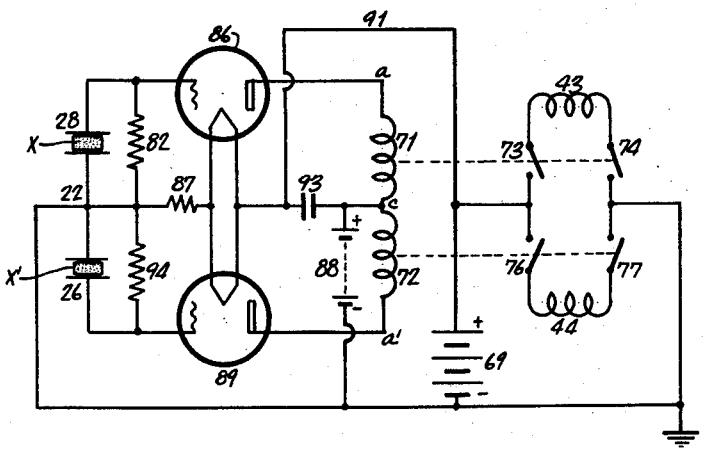
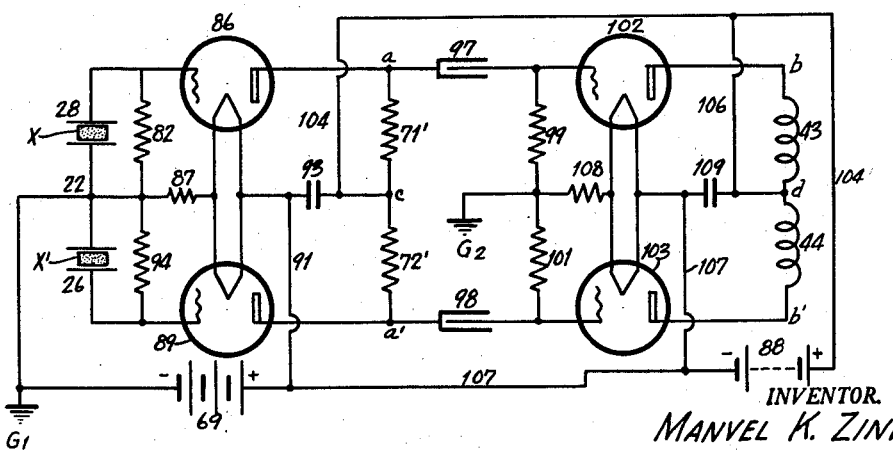
INVENTOR.
MANVEL K. ZINN
BY
Les C. Krazinski
ATTORNEY March 29, 1960  M. K. ZINN  2,930,247
POWER STEERING MECHANISM
Filed Feb. 10, 1955  4 Sheets-Sheet 4

INVENTOR.
MANVEL K. ZINN
BY
Leo C. Krazynski
ATTORNEY

United States Patent Office 2,930,247
Patented Mar. 29, 1960

2,930,247
POWER STEERING MECHANISM
Manvel K. Zinn, Manhasset, N.Y.
Application February 10, 1955, Serial No. 487,386
18 Claims. (Cl. 74—388)

This invention relates to an electro-mechanical power steering mechanism, particularly for motor vehicles, and has for its primary object to provide an arrangement for reducing an operator's effort in steering a vehicle.

Heretofore, as far as applicant is aware, operators of heavy automobiles, commercial as well as private, having large, low pressure tires find it difficult and laborious in turning the front wheels, especially when the automobile is moving slowly or when the automobile is at a standstill. This difficulty is particularly evident when attempting to park the automobile in a restricted space.

Another object of the invention, therefore, is to overcome the above disadvantages and to promote ease in steering an automobile.

It is still another object of the invention to provide an improved, simplified and substantially inexpensive mechanism that may be readily assembled to the steering apparatus of an automobile.

According to a feature of the present invention advantages are secured over the prior power steering mechanisms by providing power apparatus under control of the steering wheel, which can be operated in a normal manner, as if the apparatus did not exist. Briefly, this power apparatus, which can have a number of forms, provides a torque on the steering wheel column in a direction that amplifies the torque exerted by the operator. In one of said forms the apparatus comprises a pair of magnetically operated clutches in which inner members thereof are fixedly mounted on a steering column and outer members thereof are driven continuously in opposite directions by a source of mechanical power that can be derived from the automobile engine or from an electric motor. Thus, if one of the magnetic clutches is operated by passing an electric current through its field coil, a torque in the direction of rotation of the outer member of that clutch will be exerted on the steering column. If the other magnetic clutch is operated, the torque is reversed in direction by reason of the opposite rotation of its outer member. The amount of torque can be varied continuously from full torque in one direction to full torque in the opposite direction by varying the actuating current in the field coils of the clutches respectively from full current in one clutch down to zero current and thence up to full current in the other clutch. When current flows in the field coils of both clutches, the net torque is proportional to the difference between the two currents. For controlling operation of the clutches a set of contacts or pressure-sensitive crystals is provided on the steering column.

In another of said forms the apparatus employs hydraulic energy in which fluid is supplied at high pressure by a pump driven by the automobile engine and in which control thereof is obtained through a magnetic relay, which in turn is controlled by a set of contacts or pressure-sensitive crystals mounted on the steering column.

Figure 5:
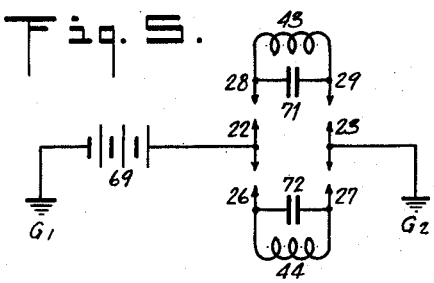
Figure 6:
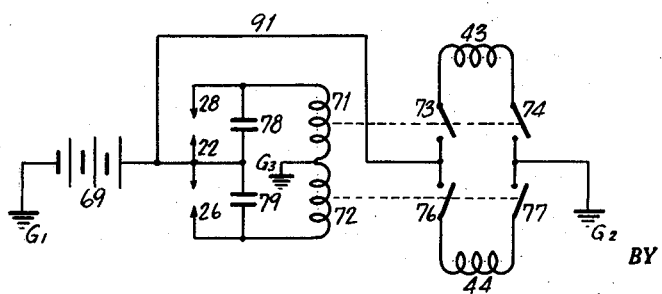
Figure 11:
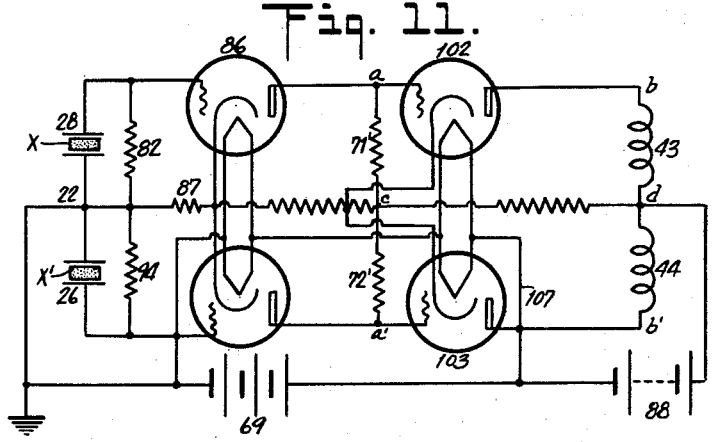
Figure 12:
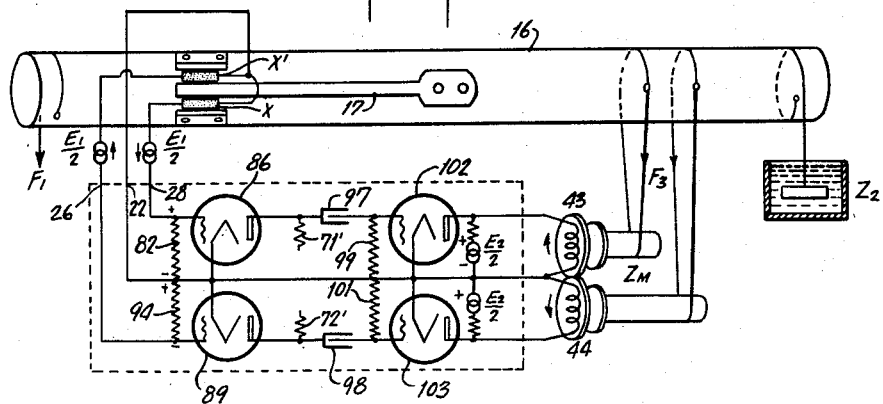
Figure 13:
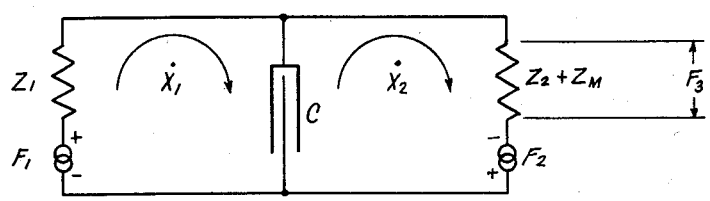

These and other features of the invention will be more fully described in the following specification, taken in connection with the accompanying drawings in which:

Fig. 1 is a perspective view of a vehicular steering wheel illustrating centrally disposed pairs of contacts fixedly mounted on a steering column and two associated outer pairs of contacts mounted on a tubular member surrounding the column, Fig. 2 is an enlarged sectional view taken along line 2—2 of Fig. 1 in the direction of the arrows illustrating the relationship between the inner and outer contacts, Fig. 3 is a sectional view of magnetic clutches mounted on the steering column illustrating one form of torque amplifier, Fig. 4 is a schematic view of a hydraulic valve arrangement illustrating another form of torque amplifier, Fig. 5 is a schematic circuit of a simple embodiment of the invention illustrating direct control of the power apparatus by the contacts, Fig. 6 is a schematic circuit of an improvement over that shown in Fig. 5 wherein a pair of relays are interposed between the contacts and the power apparatus, Fig. 7 is a schematic circuit of a further improvement, namely, over that shown in Fig. 6, wherein a pair of vacuum tubes are interposed between the contacts and the relays, Fig. 8 is a sectional view similar to that of Fig. 2 except that pressure-sensitive crystals are employed instead of contacts, Fig. 9 is a schematic circuit illustrating use of the pressure-sensitive crystals seen in Fig. 8, Fig. 10 is a schematic circuit illustrating addition of a vacuum tube amplifier to the circuit shown in Fig. 9, Fig. 11 is a schematic circuit illustrating another type of vacuum tube amplifier, termed a D.C. amplifier, in place of the amplifier shown in Fig. 10, and Figs. 12 and 13 are schematic views used for mathematical analysis of the operation of the system when its electric amplifier is as shown in Figs. 10 and 11.

Referring now to the drawings, particularly to Figs. 1 and 2, there is shown a conventional automobile steering wheel 15 having a steering post 16 modified in accordance with the present invention. The steering post 16 adjacent the wheel 15 is shown surrounded by a spaced, tubular member 17 having at its lower end a reduced portion 18 rigidly secured to the post 16 in any suitable manner, as by rivets 19. At the upper end of member 17 is provided a double pole, double throw switch 21 in conjunction with the steering post 16, the detailed construction of which comprises a pair of contacts 22, 23 mounted on an insulating plate 24, carried by the steering post 16. The contacts 22, 23 extend through the plate and accordingly project from both sides thereof for respective engagement with associated pairs of contacts 26, 27 and 28, 29 which are mounted on insulating blocks 31 and 32, respectively, secured to the inner surface of the member 17. For clarity in the drawing, wires running from the contacts of the double pole switch have been omitted.

From the foregoing, it will be readily apparent that the middle contacts 22, 23 will be made to touch and thereby make electrical connection with, the outer contacts 26, 27 or 28, 29 only when the steering column is strained by twisting it an amount sufficient to close the gap between the contacts. It is evident that if the gaps between the inner and outer contacts are equal on the two sides when the steering column is not under stress, then a torque exerted on the steering wheel by the operator will diminish the gap on one side and increase it on the other by an amount equal to the torsional strain in the length of column between the point of attachment of the inner pair of contacts and that of the exterior member supporting the outer pairs of contacts. The gap can be adjusted so that the amount of twisting strain suffered by the column when steering around corners at normal speeds will not close the gaps, whereas the much greater strain resulting from an effort to turn the wheels of the car while going very slowly or standing still will close the gaps, thereby bringing the torque of the power source to the assistance of the operator. It might be mentioned that the gap between the contacts is greatly exaggerated in relation to the dimensions of the other parts. Also, the tubular member 17 is sufficiently rigid to avoid vibration and improper contact engagement under operating conditions of the vehicle and is of such a length, about 18 inches, that its lower point of attachment at 18 is as far removed from the contacts as space will permit. As a result, a given torque exerted on the steering wheel will produce the largest possible torsional strain between the free and attached points thereof and thus produce the largest possible change in the gap between the inner and outer contacts.

In Fig. 3 is illustrated the magnetic clutch embodiment 34 wherein outer members 35 and 36 are adapted to rotate freely on the steering column 16 through use of anti-friction bearings 37 interposed therebetween. Outer members 35 and 36 are driven continuously in opposite directions by a source of power (not shown) through a shaft 38 and pinion 39 in mesh engagement with gears 41 rigidly coupled to members 35 and 36. An inner member 42 common to the outer members 35 and 36 is shown integral with the column 16, although this member 42 may be constituted as a separate element and rigidly keyed to the column. Field coils 43 and 44 are respectively shown with outer members 35 and 36. When current flows in one or the other of these field coils, magnetic powder 46 and 47 disposed in the space between inner member 42 and outer member 35 and between inner member 42 and outer member 36 coheres and tends to reduce the slip between the outer member 36 and inner member 42 or between the outer member 35 and inner member 42, thereby exerting a torque on the column 16 in one direction or the other, depending upon which field coil is energized.

The hydraulic valve embodiment 48 is illustrated in Fig. 4. Fluid under high pressure, for example, about 1500 lbs. per square inch, enters the valve unit 48 at point P. A small amount of flow occurs through orifice O into chamber 49 and nozzle N and thence through the nozzle into channel 51, which eventually returns the fluid to the supply tank (not shown) via drain 52. The rate of flow of the fluid out of the nozzle N is controlled by a flapper 53, which is a part of an armature 54 of a differential magnetic relay 56. The other parts of the relay comprise a permanent magnet 42' and the field windings 43' and 44', which are wound in the same direction so as to be magnetically aiding.

The operation of the hydraulic valve 48 is as follows: Fall of pressure along the path O—49—N is shared between the orifice O and the nozzle N. The pressure in the chamber 49 is applied to valve spool 57, which is movable in cylinder 58 and which controls the rate of flow to blades 59 of a rotary power device 61. The force of the fluid on the valve spool 57 is opposed by an adjustable cantilever type loading spring 62. Let it be assumed that, with equal and opposite currents in the windings 43' and 44' of the relay 56, the pressure drop in the orifice O is equal to the drop in the nozzle N. Then the pressure in the chamber 49 will be half the initial pressure supplied at P. Let it be assumed also that, under these conditions, a centering spring 63 is adjusted to a point where the valve spool 57 allows no net flow to the blades 59 from either side. Then, if an unbalance in the oppositely directed currents supplied to coils 43', 44' occurs, the flapper 53 will move to left or right, thereby increasing or decreasing, respectively, the pressure drop in the nozzle N and causing a similar change in pressure in the chamber 49. Fig. 4 is drawn to illustrate a case where the chamber pressure has increased from its mean value, forcing the valve spool 57 to the left, and allowing a flow of fluid in the direction of the arrows from P via channel 64, cylinder 58, and channel 66 to produce a clockwise torque on blades 59, after which the fluid returns to the drain 52 via channel 67, cylinder 58, and channel 68. A decrease in pressure in chamber 49 on the other hand produces a movement of the spool 57 to the right and a counterclockwise torque on blades 59, the fluid entering channel 67 to impinge on the blades, leaving via channel 66, and returning to the drain via cylinder 58 and channel 68. The torque is imparted to the steering column 16 or an auxiliary shaft (not shown) geared thereto.

In the ensuing description of electric circuits, the term "field coils," designated by characters 43 and 44, identifies the coils of the magnetic clutch 34 or the coils of the differential relay 56 controlling the hydraulic device, or the actuating coils of any other type of power apparatus that may be used.

Fig. 5 shows a simple schematic of electric connections to illustrate the principle of operation. When the steering column is strained sufficiently in one direction, the inner contacts 22, 23 engage the outer contacts 28, 29; while a similar strain in the opposite direction causes contacts 22, 23 to engage contacts 26, 27. When contacts 22, 23 engage contacts 28, 29, respectively, field coil 43 of one of the magnetic clutches, or of the hydraulic valve is energized by car battery 69, the circuit being completed through ground connections $G_1$ and $G_2$. When contacts 22, 23 respectively engage contacts 26, 27, the other field coil 44 is similarly energized. Because of the manner of operation of the magnetic clutch and hydraulic devices, the direction of the torque applied to the steering column reverses, as desired, when the inner contacts go from 28, 29 to 26, 27, or vice versa. Although four contacts are shown, the circuit would work equally well with three contacts by eliminating 23, 29 and 27. Electric condensers 71 and 72 are connected across the field coils to minimize sparking at the contacts, when the circuit is reversed. The other, more refined, embodiments, next to be described, obviate sparking by more elaborate circuits that are intended to be improvements over the simple circuit of Fig. 5.

The circuit shown in Fig. 6 has only three primary contacts on the steering column, namely, an inner one 22 and two outer ones 26 and 28. When contact 22 engages contact 28, the current from the car battery 69 flows through the relay winding 71 by way of the contacts and the ground connections $G_1$ and $G_3$. When contact 22 engages contact 26, the battery current flows through the other relay winding 72. Winding 71, when energized, closes the switches 73 and 74, the mechanical coupling being indicated by the upper dotted line. Winding 72 performs the same function in relation to the other pair of switches 76 and 77, as indicated by the lower dotted line. The field coils are shown at 43 and 44, as in the preceding illustration. The switches 73, 74, 76, 77, are capable of handling relatively large currents through many operations without deterioration. Mercury relay switches that would perform satisfactorily in this application are commercially available. The primary contacts 22, 26, 28 handle only the relatively small currents necessary sufficiently to energize the relay windings 71 and 72. The condensers 78, 79 are provided across the contacts further to minimize whatever sparking occurs.

Fig. 7 shows how vacuum tubes can be used to improve the functioning of the circuit. Only three primary contacts, a central one and two outer ones, are required, as in the preceding circuit. The central contact 22 is connected to a source of positive voltage 81. When contact 22 engages one of the outer contacts, 28, for example, current from source 81 flows through the contacts and a high resistance 82 back to the negative terminal of source 81 via leads 83 and 84. The potential drop across resistor 82, produced by this flow of current, causes the potential of the control grid of a triode 86 to become positive with respect to the filamentary cathode whereas, when the contacts are open, the potential of the control grid is effectively negative with respect to the cathode by virtue of the flow of the filament heating current through the resistor 87. The change in potential of the grid caused by the closing of contacts 22 and 28 causes an increase in the current flowing from the anode to the cathode of tube 86. This anode current is derived from a high voltage source 88 and flows through the relay winding 71. The increased anode current through 71 causes the pair of power switches 73 and 74 to close. When the central contact 22 engages the other contact 26, the lower side of the circuit, comprising tube 89 and similarly associated elements is energized with a resulting increase in current through the other relay winding 72, which causes the other pair of power switches 76, 77 to close. Since the upper half of the circuit is at the same time de-energized, switches 73 and 74 open. The consequences of the operation of the power switches with respect to the reversal of the torque exerted by the power apparatus on the steering column are the same as in the preceding embodiments.

The high voltage source 88 and the lower voltage source 81 are shown as separate batteries. Since these sources need not supply large currents, it might be more convenient to obtain them from a special power supply circuit operating from the main car battery 69. The manner of obtaining such voltages from the low voltage car battery by means of an interrupter, rectifier and filter is well understood and widely practiced in supplying anode voltage to the radio receiving set in an automobile. The filament heating supply for the vacuum tubes can be derived directly from the car battery 69 through connection 91, grid biasing resistor 87 and the common ground connection. Large condensers 92 and 93 are provided for filtering action to prevent unwanted feedback from anode to grid through the common high voltage supply, when such is used in place of the separate battery supplies 81 and 88. The principal advantage of this embodiment over those previously described is that the current carried by the primary contacts 22, 26, and 28 is very small by virtue of the high resistances 82 and 94. This eliminates sparking. Furthermore, since the resistance of the circuits is very high, any dirt present on the contacts will not easily interfere with the proper operation of the circuit.

The remaining figures show a further refinement of the steering control circuit whereby the primary contacts are eliminated altogether by using, in their place, a pair of pressure-sensitive crystals. These crystals can be of two types. One is the piezo-electric type, employing a material such as quartz, for example, although a number of other materials exhibit the piezo-electric effect. A piezo-electric crystal has the property that a force applied between two of its faces causes electric charges of opposite sign to appear between these, or some other pair, of faces. This difference of electric potential can be used to operate a vacuum tube by connecting the charge-bearing faces of the crystal to its control grid and cathode. The other type of crystal is one whose electrical resistance changes when it is subjected to pressure. Germanium, for example, is a material that exhibits this property. The desired voltage, proportional to the applied pressure, is then obtained by passing a small direct current through the crystal.

Fig. 8 shows a pair of identical crystals $x$ and $x'$ mounted between the insulating vane 24 on the steering column 16 and outer pressure blocks 94 and 96 mounted on the inside surface of the outer member 17. The arrangement of these parts is similar to the arrangement illustrated in Figures 1 and 2, already described, except that the contacts are replaced by the crystals.

Fig. 9 shows an electric circuit suitable for utilizing the voltages of the crystals $x$, $x'$ to control the power apparatus through vacuum tubes and relay switches. When the steering column 16 in Fig. 8 is strained in a counterclockwise sense, the resulting pressure on the crystal $x$ causes a voltage to appear between grid and cathode of the vacuum tube 86, to which crystal $x$ is connected. A clockwise strain of steering column 16 puts pressure on the other crystal $x'$, causing a voltage to appear between grid and cathode of the other vacuum tube 89, to which crystal $x'$ is connected. Apart from the replacement of the contacts 22, 26, 28, by the crystals, the functions of the circuit elements in Fig. 9 are the same as those of the corresponding elements, designated by the same characters, in Fig. 7. The only difference is that the low voltage source 81 and the blocking condenser 92, shown in Fig. 7, are not required for the circuit of Fig. 9, because the crystals themselves provide the activating voltage on the grids of the tubes. The behavior of this circuit with the crystals is esentially the same as with the contacts, because a certain threshold value of pressure must be applied to one of the crystals before it generates sufficient voltage to actuate the relay switch connected in the anode circuit of the associated vacuum tube.

In Fig. 10 is shown a circuit that makes full use of the continuous variation of actuating voltage obtainable by means of the crystals. This embodiment constitutes a refinement upon the preceding embodiments in that the sudden switching operations are replaced by continuously variable control. This is accomplished by feeding current to the field coils by a vacuum tube power amplifier of the type commonly known as "push-pull." This arrangement provides a current continuously variable from full value in one direction to full value in the reverse direction and of the right amount needed at each instant to cause the steering mechanism to follow the operation of the steering wheel.

Referring to Fig. 10, the first amplifier, with the crystals $x$ and $x'$ connected to its input, is the same as the amplifier illustrated in Fig. 9, with the elements numbered in the same way, except that the relay windings 71 and 72 of Fig. 9 are now replaced by resistances 71' and 72', for coupling to the input of the succeeding power amplifier through condensers 97 and 98 and grid resistances 99 and 101. Vacuum tubes 102 and 103 are of sufficient power capacity to deliver full current, when required, to the field coils 43 and 44, fed by the battery 88, which also supplies the necessary anode voltage to the vacuum tubes through leads 104 and 106. The car battery 69 supplies filament current to the four vacuum tubes through leads 91 and 107, bias resistors 87 and 108 and the ground connections $G_1$ and $G_2$. Condensers 93 and 109 are used for isolating the circuits carrying variable current from the circuits of the batteries or other power source. Resistances 87 and 108 provide a proper negative bias voltage on the grids of the tubes.

When crystals of the piezo-electric type are employed, the operation of the circuit is as follows: Assume the crystals $x$, $x'$ to be under some initial pressure when the steering wheel is at rest. A movement of the wheel will increase the pressure on one crystal and diminish it on the other. Suppose that the direction of movement of the wheel is such as to increase the pressure on crystal $x$ and decrease the pressure on crystal $x'$. Suppose, further, that the crystals are so poled that this pressure change causes a positive charge to appear on surface 28 of crystal $x$ and a negative charge on surface 26 of crystal $x'$ relative to the other surfaces, which are held at ground potential by virtue of the common terminal 22. These charges immediately begin to leak off through the resistances 82 and 94. These resistances should be high enough so that the time constant of the circuit, which is the product of each resistance R by the capacitance C of the crystal, is on the order of several seconds. The charges on the crystals, of the signs assumed, cause the potential of the control grid of tube 86 to rise and that of tube 89 to fall, relative to the potential of their respective filaments. These changes in the grid potentials result in an increase in the current flowing from anode to cathode of tube 86 and a decrease in the corresponding current of tube 89. By virtue of the increased potential drop through resistance 71' and the decreased drop through resistance 72', the potential of point $a$ then falls, and that of point $a'$ rises, relative to the potential of the point $c$ at the junction of resistances 71' and 72'. These potential changes, acting through the capacitances 97, 98 and the resistances 99, 101, cause the potential of the control grid of tube 102 to fall, and that of tube 103 to rise, relative to the potentials of their respective filaments. In order to transmit slow changes of potential with satisfactory fidelity of wave form, it again is important that the RC product, or time constant, of capacitance 97 and resistance 99, and of capacitance 98 and resistance 101, be sufficiently large. The final result of the train of events above described is a decrease in the current through the field coil 43, and an increase of current in the other coil 44. When the whole system is at rest, equal, but oppositely directed, anode currents flow from the battery 88 through the two field coils 43 and 44, both magnetic clutches slip by the same amount or, if the hydraulic device is used, its control relay armature remains in a neutral position. In either case, no net steering torque is produced. When the above changes in current occur, however, the magneto-motive force of field coil 43 is reduced, while the magneto-motive force of field coil 44 is increased, with the result that a net torque is produced. The relative poling of all the components of the system, both electrical and mechanical, should be such that the torque finally produced tends to oppose the changes of pressure of the crystals that give rise to the above described chain of events. If the direction of the pressure is reversed, current in field coil 43 rises and that in field coil 44 falls, with the result that the direction of the net assisting torque is reversed. If the other type of crystals, those whose resistance changes with pressure, are employed instead of piezo-electric crystals, the operation of the amplifying circuit is similar except that provision would be made to have a small direct current flowing in the crystals at all times.

In the preceding description of the amplifiers it has been mentioned that, in order to amplify slow variations of torque of the steering wheel, the RC product, or time constant, of the combinations of resistance R and capacitance C that occur in the circuits should be made large. These considerations can be obviated by using the type of amplifier illustrated in Fig. 11. This is a D.C. amplifier in which the time constants of the two stages are effectively infinite, so that steady or unvarying torques can be amplified. D.C. amplifiers can take various forms. The form illustrated in Fig. 11 has been chosen because the tubes are arranged in "push-pull" pairs in a circuit designed to balance out the effect of slow drifts in the anode currents caused by changes in battery potentials. Very small D.C. voltages can be successfully amplified with such a circuit by employing a regulated power supply and pairing the two tubes of each stage to be as nearly alike in their characteristics as possible.

The above is a qualitative description of the operation of the circuits of Figs. 10 and 11. To design the system for most effective operation and, in particular, to avoid self-oscillation or "hunting," which is possible in such a re-entrant system containing both electrical and mechanical sources of power, it is necessary to have a mathematical description of the whole operation. Certain theoretical principles that serve to define the most effective design of the system will now be disclosed.

Fig. 12 is a diagram illustrating the function of the various mechanical and electrical elements in schematic fashion suitable for mathematical treatment. The crystals $x$ and $x'$ are shown mounted on the steering column 16 in the manner already described except that, for ease of illustration, the supports are differently disposed. Electrical connections are shown going from the surfaces of the crystals to the input of the push-pull amplifier, illustrated more fully in Fig. 10, just described. The output of the amplifier is shown connected to the field coils 43 and 44. The schematic drawing implies the use of magnetic clutches, but the analysis to follow applies equally well to the hydraulic device. $F_1$ designates the actuating torque at the left end of the steering column and $F_3$ designates the assisting torque exerted at the right end thereof. The load $Z_2$, which comprises the friction of the car wheels on the road and their inertia, is represented as a dashpot at the right. Following is a complete list of the symbols used:

$F_1$ is applied torque.
$F_2$ is torque developed by the clutches or hydraulic device at the load when the latter is clamped ($Z_2=\infty$).
$F_3$ is torque at the load when not clamped $=\dot{x}_2(Z_2+Z_M)$.
C is compliance of the steering column $=x_1/F_1$ with $Z_1=0$ and $Z_2=\infty$.
$Z_1$ is internal mechanical impedance of the source $F_1$.
$Z_2$ is mechanical impedance of the load.
$Z_M$ is mechanical impedance of the pair of clutches or hydraulic device at the load end.
W is ratio of output force to input voltage of the whole electro-mechanical system $=F_2/E_1$.
$E_1$ is input voltage grid-to-grid, as shown.
$E_2$ is output voltage anode-to-anode, as shown.
$x_1$ is torsional displacement of the column at the driven end.
$x_2$ is torsional displacement of the column at the load end.
$\dot{x}_1=dx_1/dt=px_1$
$\dot{x}_2=dx_2/dt=px_2$
$t$ is time.
$p$ is a generalized complex frequency variable, equivalent, by operational methods, to $d/dt$.

It is assumed that the voltage $E_1$ produced by the crystals is proportional to the force exerted on them and this force will be proportional to the difference in torsional displacement of the two ends of the column. That is, $$E_1=\frac{k(x_1-x_2)}{C}=\frac{k(\dot{x}_1-\dot{x}_2)}{pC}$$

where $k$ is a real constant. Then, from the definition of W, we have $$F_2=\frac{Wk}{pC}(\dot{x}_1-\dot{x}_2)$$

and the equations defining the operation of the whole electro-mechanical system shown in Fig. 12 are as follows:

$$F_1=Z_1\dot{x}_1+\frac{\dot{x}_1-\dot{x}_2}{pC}$$

$$F_2=-\frac{\dot{x}_1-\dot{x}_2}{pC}+\dot{x}_2(Z_2+Z_M)=\frac{Wk}{pC}(\dot{x}_1-\dot{x}_2) \quad (1)$$

An equivalent electric circuit that is described by these same equations is shown in Fig. 13 with the forces $F_1$ and $F_2$ represented as electric generators and the velocities $\dot{x}_1$ and $\dot{x}_2$, as electric currents. The capacitance C is the compliance of the steering column. The inertia and resistance of the steering column are assumed to be negligible in comparison with the corresponding properties of the terminal mechanical impedances $Z_1$ and $Z_2+Z_M$ and in any event could be incorporated, mathematically, as a part of them. For those accustomed to the language of electrical technology, Fig. 13 provides an instructive insight into the behavior of the system. From Equations 1 the determinant of the system is $$D = \frac{Z_1(1+Wk)+(Z_2+Z_M)(Z_1pC+1)}{pC} \quad (2)$$

The solution for the terminal velocity $\dot{x}_2$ at the load is $$\dot{x}_2 = \frac{F_1(1+Wk)}{DpC} = \frac{F_1(1+Wk)}{Z_1(1+Wk)+(Z_2+Z_M)(Z_1pC+1)} \quad (3)$$

If the amplifier were turned off so that the system provided no assistance in turning the steering column, the terminal velocity would be given by (3) with $W=0$, namely, $$\dot{x}_{20} = \frac{F_1}{Z_1+(Z_2+Z_M)(Z_1pC+1)} \quad (4)$$

Therefore the "gain" accomplished by the system when the amplifier is turned on can be defined as $$\frac{\dot{x}_2}{\dot{x}_{20}} = \frac{x_2}{x_{20}} = \frac{(1+Wk)[Z_1+(Z_2+Z_M)(Z_1pC+1)]}{Z_1(1+Wk)+(Z_2+Z_M)(Z_1pC+1)} \quad (5)$$

To understand the significance of Equation 5, assume that the load impedance $Z_2$ is very large compared to the source impedance $Z_1$. Then $$\frac{x_2}{x_{20}} \rightarrow 1+Wk \quad (6)$$

This shows that for proper operation of the system, that is to have $x_2/x_{20}>1$, the connections of the amplifier and field coils should be such that W is either a real positive number or, at least, that the magnitude, or modulus, of $1+Wk$ should be greater than 1, i.e.

$$[1+Wk]>1$$

For example, if $k=10^{-3}$ and $W=10^4$, the gain of the system would be 11. That is, for a given applied steady torque, the rotation of the load would be 11 times as great with the amplifier system working, as compared to a system with no amplifier. Or, to state the gain another way: to produce a given rotation at the load, only one eleventh as much force need be exerted on the steering wheel.

To obtain a more precise notion of how the system operates and, in particular, to examine its stability, it is necessary to specify the variables W, $Z_1$, $Z_2$ and $Z_M$ as functions of the frequency variable $p$. The discussion following does not purport to investigate an actual system but rather to illustrate the procedure of an idealized system. One skilled in the art of electro-mechanical analysis can readily apply the methods so outlined to an actual system.

To this end it is assumed that the transmission function $Wk$ of the electro-mechanical part of the system is a real positive constant; that is, it is independent of the frequency. This ideal design could be approached by making the RC products of the resistance and capacitance elements in the amplifier very large or by using the D.C. amplifier shown in Fig. 11 and by designing the clutches or hydraulic device so that the force developed on a clamped load would be proportional to the currents in the field coils.

It is assumed, further, that the impedance $Z_1$ of the source is a mass $L_1$. This would be the case, for example, if the force $F_1$ were applied by suspending a mass $L_1$ on the cord shown wrapped around the steering column at the left end of the schematic drawing, Fig. 12. It also is assumed that the total mechanical impedance, $Z_2+Z_M$, at the right end of the system is a pure stiffness $R_2$. Then the characteristic determinant of the system, as given by (2), becomes $$D = \frac{pL_1(1+Wk)+R_2(p^2L_1C+1)}{pC} \quad (7)$$

We now have the information necessary to determine the stability of the system. It is well-known that any system is stable if, and only if, the solutions of the equation $$D(p)=0 \quad (8)$$

obtained by setting its characteristic determinant equal to zero, all have negative real parts. From (7), then it appears that have to solve $$p^2L_1CR_2+pL_1(1+Wk)+R_2=0 \quad (9)$$

for $p$. The two solutions are $$p = \frac{-L_1(1+Wk) \pm \sqrt{L_1^2(1+Wk)^2-4L_1CR_2^2}}{2L_1CR_2} \quad (10)$$

If $4L_1CR_2^2 < L_1^2(1+Wk)^2$, both roots are real and since the absolute value of the second term in the numerator is always less than that of the first, both these roots are negative. If $4L_1CR_2^2 > L_1^2(1+Wk)^2$, both roots are complex with the common real part, $-(1+Wk)/2CR_2$, which is again negative, since $Wk$ is a real positive constant. Therefore the system is stable under all conditions.

For an actual system, considered in complete detail, the designer would usually obtain, instead of Equation 9, a polynomial of higher degree, the roots of which might be difficult to determine. Whether or not the roots all have negative real parts can be readily determined in any case, however, by applying a well-known mathematical device called "Routh's Criterion," which is explained on page 407 of "The Mathematics of Circuit Analysis" by E. A. Guillemin, published by John Wiley & Sons, New York, 1949 edition.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a steering mechanism for a vehicle having a manually operable steering post, an elongate member having one end rigidly secured to said steering post and having another end thereof spaced from said post, electric circuit control means on said steering post and on said elongate member adjacent said spaced end responsive to revolvable movement of said steering post, said steering post being continuous and integral between said control means and said secured end of said elongate member, power means operatively connected to said steering post, and means responsive to said control means, including electric circuit means, to cause said power means to assist movement of said manually operable steering post.

2. In a steering mechanism for a vehicle having a manually operable steering post, an elongate member having one end rigidly secured to said steering post and having another end thereof spaced from said post, electric circuit control means on said steering post and on said elongate member interposed in the space between said steering post and said spaced end of said member responsive to differential movement between said steering post and said elongate member, said steering post being continuous and integral between said control means and said secured end of said elongate member, power means operatively connected to said steering post, and means responsive to said control means, including electric circuit means, to cause said power means to assist movement of said manually operable steering post.

3. In a steering mechanism for a vehicle having a manually operable steering post, an elongate member having one end rigidly secured to said steering post and having another end thereof spaced from said post, control means on said steering post and on said elongate member interposed between said steering post and said spaced end of said member responsive to differential movement between said steering post and said elongate member, said steering post being continuous and integral between said control means and said secured end of said elongate member, and power means including mechanical means coupled to a primary source of power in said vehicle operatively connected to said steering post, said power means being responsive to operation of said control means to assist movement of said manually operable steering post.

4. In a steering mechanism for a vehicle having a manually operable steering post, an elongate member having one end rigidly secured to said steering post and having another end thereof spaced from said post, control means on said steering post and on said elongate member interposed between said steering post and said spaced end of said member responsive to differential movement between said steering post and said elongate member, said steering post being continuous and integral between said control means and said secured end of said elongate member, and power means including hydraulic means connected with a high pressure fluid source in said vehicle operatively connected to said steering post, said power means being responsive to operation of said control means to assist movement of said manually operable steering post.

5. In a steering mechanism for a vehicle having a manually operable steering post, an elongate member having one end rigidly secured to said steering post and having another end thereof spaced from said post, control means on said steering post and on said elongate member interposed between said steering post and said spaced end of said member responsive to differential movement between said steering post and said elongate member, said steering post being continuous and integral between said control means and said secured end of said elongate member, and power means operatively connected to said steering post, said power means being responsive to operation of said control means to assist movement of said manually operable steering post, and said power means comprising mechanical means coupled to a primary source of power in the vehicle, electro-magnetic means including an inner member fixedly secured to said steering post, a pair of outer members freely rotatable around the steering post and driven in opposite directions by said mechanical means, and a pair of electro-magnetic coils responsive to said control means for controlling rotation of said inner member and steering post.

6. In a steering mechanism for a vehicle having a manually operable steering post, an elongate member having one end rigidly secured to said steering post and having another end thereof spaced from said post, control means on said steering post and on said elongate member interposed between said steering post and said spaced end of said member responsive to differential movement between said steering post and said elongate member, said steering post being continuous and integral between said control means and said secured end of said elongate member, and power means operatively connected to said steering post, said power means being responsive to operation of said control means to assist movement of said manually operable steering post, said control means comprising a pair of oppositely faced contacts mounted on said steering posts and a pair of spaced contacts mounted on said elongate member for respective engagement with said steering post contacts, said steering post contacts being disposed on opposite sides of a non-conductive plate secured to said steering post and said spaced contacts being respectively disposed on non-conductively spaced blocks secured to said elongate member.

7. In a steering mechanism for a vehicle having a manually operable steering post, an elongate member having one end rigidly secured to said steering post and having another end thereof spaced from said post, control means including a pair of pressure sensitive crystals on said steering post and on said elongate member interposed between said steering post and said spaced end of said member responsive to differential movement between said steering post and said elongate member, said steering post being continuous and integral between said control means and said secured end of said elongate member, and power means operatively connected to said steering post, said power means being responsive to operation of said control means to assist movement of said manually operable steering post.

8. In a steering mechanism according to claim 2, wherein said elongate member comprises a hollow tube surrounding said steering post with a reduced end portion secured to the steering post.

9. In a steering mechanism according to claim 2, wherein said control means comprise a pair of oppositely faced electric contacts mounted on said steering post and a pair of spaced electric contacts mounted on said elongate member for respective engagement with said steering post contacts.

10. In a steering mechanism according to claim 7, wherein said steering post includes a plate having a face of each of said crystals mounted on opposite sides of said plate and said elongate member includes a pair of non-conductive blocks having opposite faces of said crystals mounted on inner faces of said blocks.

11. In a steering mechanism for a vehicle having a manually operable steering post, an elongate member having one end rigidly secured to said steering post and having another end thereof spaced from said post, control means on said steering post and on said elongate member interposed between said steering post and said spaced end of said member responsive to differential movement between said steering post and said elongate member, said steering post being continuous and integral between said control means and said secured end of said elongate member, power means operatively connected to said steering post, means including a pair of field coils, a valve responsive to energization of said field coils for controlling operation of said power means, and electrical power amplifying means responsive to said control means and connected to said field coils for increasing effective action of said field coils.

12. In a steering mechanism according to claim 11, wherein said power amplifying means comprise a pair of relay windings and associated switches for supplying large currents to said field coils.

13. In a steering mechanism according to claim 12, wherein said power amplifying means include a vacuum tube amplifier having its input connected to said control means and its output connected to said relay windings.

14. In a steering mechanism according to claim 11, wherein said control means comprise a pair of pressure sensitive crystals.

15. In a steering mechanism according to claim 14, wherein said power amplifying means comprise a pair of relay windings with associated switches for supplying large currents to said field coils, and a vacuum tube amplifier having its input connected to said crystals and its output connected to said relay windings.

16. In a steering mechanism according to claim 14, wherein said power amplifying means comprise a vacuum tube amplifier having its input connected to said crystals, a second vacuum tube amplifier having its output connected to said field coils, and resistance and condenser elements interposed between an output of said first amplifier and an input of said second amplifier.

17. In a steering mechanism according to claim 14, wherein said power amplifying means comprise a direct current vacuum tube amplifier having its input connected to said crystals and its output connected to said field coils.

18. In a steering mechanism according to claim 14, wherein said power amplifying means comprise a direct current vacuum tube amplifier having its input connected to said crystals, a second direct current vacuum tube amplifier having its output connected to said field coils, and resistance elements interposed between an output of said first amplifier and an input of said second amplifier.

References Cited in the file of this patent

UNITED STATES PATENTS

| | | |
|---|---|---|
| Re. 23,673 | Penrose | June 30, 1953 |
| 1,144,552 | Lardner et al. | June 29, 1915 |
| 1,883,163 | Van Voorhis | Oct. 18, 1932 |
| 2,311,010 | Vickers | Feb. 16, 1943 |
| 2,590,029 | Minorsky | Mar. 18, 1952 |
| 2,640,370 | Murphy | June 2, 1953 |
| 2,756,605 | Lincoln et al. | July 31, 1956 |
| 2,788,671 | Talbot | Apr. 16, 1957 |
| 2,855,789 | Von Thungen | Oct. 14, 1958 |

FOREIGN PATENTS

| | | |
|---|---|---|
| 1,096,026 | France | Dec. 29, 1954 |